UNITED STATES PATENT OFFICE.

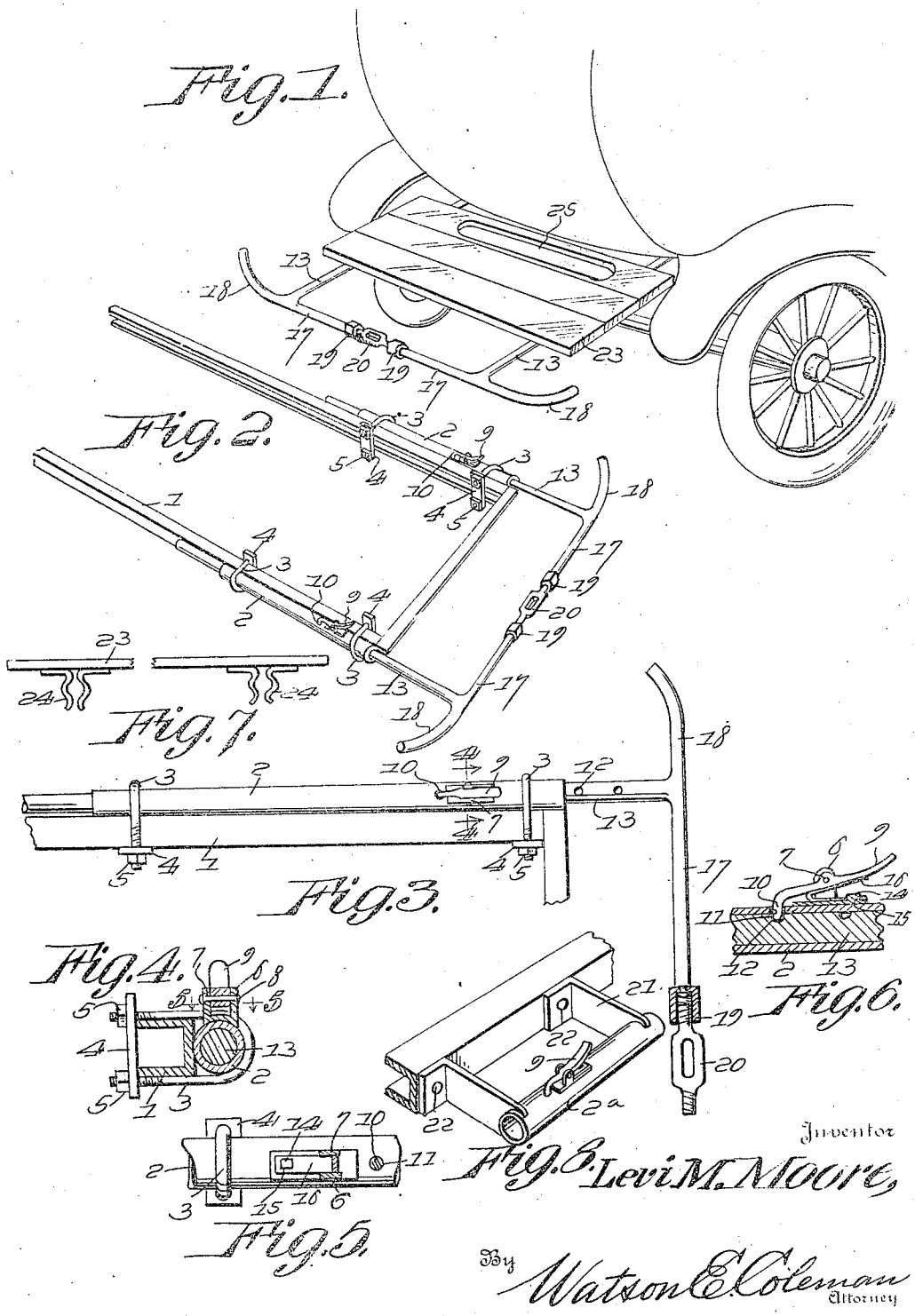

LEVI M. MOORE, OF DANVILLE, ILLINOIS.

ADJUSTABLE DETACHABLE BUMPER AND CARRYING RACK.

1,412,192.                Specification of Letters Patent.   Patented Apr. 11, 1922.

Application filed August 27, 1921. Serial No. 495,994.

*To all whom it may concern:*

Be it known that I, LEVI M. MOORE, a citizen of the United States, residing at Danville, in the county of Vermilion and State of Illinois, have invented certain new and useful Improvements in Adjustable Detachable Bumpers and Carrying Racks, of which the following is a specification, reference being had to the accompanying drawings.

It is the purpose of the present invention to provide a combination bumper and carrying rack adapted for detachable connection to automobile and truck chassis, the same being so constructed that it may be used ordinarily as a bumper, and when touring or hauling it may be employed for carrying articles of any description.

Another purpose is the provision of a device of this kind which is extensible and may carry supporting boards or the like, so that outing paraphernalia, such as tents, bedding and the like, or containers may be carried at the rear of the truck or automobile.

Still another purpose is the provision of a combined bumper and carrying rack, which is extensible a short distance, or to a considerable degree, so that in the former case small containers or the like may be supported and carried, and in the latter case heavier and larger articles may be carried, or may be used as an extension to support sufficient number of boards, whereby it may be used as a bed, especially when a tent is used for housing the truck or automobile.

A further purpose consists in the provision of an extensible bumper and carrying rack, wherein the extensible parts thereof may be held in different adjusted positions and against rattling, provision being made for connecting the extensible parts to insure the prevention of rattling.

A still further purpose is the provision of a rack, wherein one of the boards (which is supported upon the rack) is provided with a slot for the reception of the tire holder, which is usually mounted at the rear of the automobile.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view showing the rear portion of an automobile, showing the extensible detachable bumper and carrying rack as applied to the chassis, and showing several boards, constituting a platform, as mounted upon the rack;

Figure 2 is a perspective view of the rear portion of an automobile or truck chassis, showing the rack retracted, and used as a bumper, or used for carrying a container;

Figure 3 is a plan view of one side of the automobile or truck chassis, showing the means for holding the rack in different positions;

Figure 4 is a sectional view on line 4—4 of Figure 3;

Figure 5 is a sectional view on line 5—5 of Figure 4;

Figure 6 is a longitudinal sectional view through the tubular guide, showing the casting or bracket 6 as applied including the latch or dog;

Figure 7 is a detail edge view of one of the boards 23 showing the clips 24; and Figure 8 is an enlarged detail perspective view of one side of the chassis, showing a modified means consisting of a bracket, for connecting the rack to the chassis.

Referring to the drawings, 1 designates the chassis of an automobile or truck, and secured to the opposite side thereof near the rear end are tubular guides 2. Suitable staples 3 straddle the tubular guides, and the sides of the chassis, and have their arms passing through the plates 4, there being nuts 5 threaded upon the arms to draw the guides closely in engagement with the sides of the chassis.

Mounted upon the upper surface of the tubular guides are brackets or castings 6 provided with ears 7, between which, upon fulcrum pins 8 are holding dogs 9. The brackets or castings 6 may be secured to the tubular guides by any suitable means, preferably by spot welding, so as not to interfere with the telescopical engagement of the rack members with the guides. The noses 10 of the dogs pass through openings 11 in the walls of the guides, and enter depressions or sockets 12 in the rack members 13. The forward extending arms or rods of the rack members 13 telescope the tubular guides, and it will be obvious that these arms may be any suitable length, so that the rack may be extended a short distance or a considerable distance, for instance about seven or eight feet more or less. When the rack is extended a short distance, it may support a platform, which may carry hampers, or other articles or containers, or when extended a substantial distance, it may carry heavier articles. Also when extended a substantial distance the rack may be used as means for supporting bed clothing, thereby providing an extensible bed attached to the automobile, especially when the automobile is housed in a tent or other shelter.

The forwardly extending arms of the rack may have any number of sockets or depressions 12, so that the members of the rack may be held in different adjusted positions by means of the dogs.

The upper surface of the guides adjacent the brackets 6 are provided with lugs 14 which enter the openings 15 of the lower arms of the leaf springs 16. These leaf springs engage between the ears of the brackets or castings 6, and their free arms engage under the handled ends of the dogs, thereby normally holding the noses of the dogs in engagement with the sockets or depressions 12. By depressing the handles of the dogs, it is possible to retract their noses from the depressions or sockets, so that the rack may be extended or adjusted.

The rear ends of the forward arms of the racks 13 have lateral portions 17 and 18, the portions 17 extend toward each other, and are provided with knuckle nuts 19. The portions 18 extend laterally in opposite directions and are slightly curved, so that when the rack is extended a short distance, it is used as a bumper, or as a carrying rack for smaller articles.

A turn buckle 20 has its opposite ends threaded with right and left threads and are connected to the knuckle nuts 19, so that the two sections of the rack may be drawn toward each other, and thereby insure the prevention of rattling of the parts. The dogs also act to insure prevention of rattling of the parts.

In Figure 8 the tubular guides 2ª are mounted upon the lateral brackets 21, which are in turn secured or bolted at 22 to the sides of the chassis. In fact the tubular guides 2ª in Figure 8 form integral parts of the brackets 21, otherwise the guides are the same as those shown in the other figures, and are provided with the holding dogs 9.

As shown in Figure 1 there is a plurality of boards 23 mounted upon the rack, thereby constituting a platform, for the purpose of carrying heavy articles, or for the purpose of supporting the mattress or bed clothing, so that the rack may be used as a bed. The rack may carry various articles, such as heavy boxes, containers, pianos or the like. These boards 23 have clips 24 secured upon their under surfaces, arranged in pairs, so as to straddle the forward arms of the racks, in order to hold the boards in position and together from rattling. One of the boards is provided with an elongated slot 25, for the reception of the usual tire holder, which is ordinarily carried at the rear end of the automobile.

The adjustable detachable bumper and carrying rack may also be used as a table. For instance the rack may be extended and by placing the boards 23 thereon, with a suitable covering over the boards, it may be used as a dining table, or upon which games and the like may be played.

The invention having been set forth, what is claimed as being new and useful is:

1. In a device for the purpose indicated, the combination with a chassis, of guides secured to the side of the chassis, a rack comprising extensible members telescoping the guides, means for holding said members in different adjusted positions, and means adjustably connecting the adjacent ends of said members to prevent rattling.

2. In a device for the purpose indicated, the combination with a chassis, of guides connected to the sides of the chassis, an extensible frame having forwardly extending arms extensibly and telescopically engaging said guides, means mounted upon the guides and engaging laterally therethrough and adjustably connecting with the arms of the frame, for holding the frame extensibly and adjustably in different positions.

3. In a device for the purpose indicated, the combination with a chassis, of guides connected to the sides of the chassis, an extensible frame having forwardly extending arms extensibly and telescopically engaging said guides, means mounted upon the guides and engaging laterally therethrough and adjustably connecting with the arms of the frame, for holding the frame extensibly and adjustably in different positions, said frame comprising two sections having their rear ends provided with laterally projecting parts, certain of said parts extending toward each other, the other of said parts extending laterally away from each other, and means adjustably connecting the parts which extend toward each other, thereby preventing the two sections of the frame from relatively rattling.

4. In a device for the purpose indicated, the combination with a chassis, of guides mounted upon the sides thereof, a frame having forwardly extending arms provided with a plurality of sockets telescoping extensibly through the guides, spring tension dogs mounted upon the guides and having their noses to engage certain of said sockets, for holding the frame in different adjusted positions, the rear ends of the arms having laterally extending parts, certain of the parts extending toward each other, other of said parts extending laterally away from each other, and means adjustably connecting those parts which extend toward each other, thereby preventing rattling.

5. In an adjustable detachable bumper and carrying rack, the combination with a chassis, of guides mounted on the sides thereof, of a frame extensibly and adjustably engaging said guides, a platform resting upon the frame and provided with a plurality of clips, to straddle the sides of the frame to prevent rattling of the parts of the platform.

6. In an adjustable detachable bumper and carrying rack, the combination with a chassis, of guides mounted on the sides thereof, of a frame extensibly and adjustably engaging said guides, a platform resting upon the frame and provided with a plurality of clips, to straddle the sides of the frame to prevent rattling of the parts of the platform, a portion of said platform having an elongated slot, for the reception of the usual tire holder or carrier, which is ordinarily mounted on the rear of an automobile.

In testimony whereof I hereunto affix my signature.

LEVI M. MOORE.